(12) United States Patent
Jayasena et al.

(10) Patent No.: US 10,162,757 B2
(45) Date of Patent: Dec. 25, 2018

(54) PROACTIVE CACHE COHERENCE

(71) Applicant: Advanced Micro Devices, Inc., Sunnyvale, CA (US)

(72) Inventors: Nuwan Jayasena, Sunnyvale, CA (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/370,734

(22) Filed: Dec. 6, 2016

(65) Prior Publication Data

US 2018/0157589 A1 Jun. 7, 2018

(51) Int. Cl.
*G06F 12/08* (2016.01)
*G06F 12/0815* (2016.01)
*G06F 12/084* (2016.01)

(52) U.S. Cl.
CPC ...... *G06F 12/0815* (2013.01); *G06F 12/084* (2013.01); *G06F 2212/60* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 6,775,749 | B1 * | 8/2004 | Mudgett | G06F 12/0831 711/119 |
| 7,363,435 | B1 * | 4/2008 | Stenstrom | G06F 12/0815 711/141 |
| 2007/0255908 | A1 * | 11/2007 | Zeffer | G06F 12/0817 711/141 |
| 2008/0235746 | A1 | 9/2008 | Peters et al. | |
| 2010/0205408 | A1 * | 8/2010 | Chung | G06F 9/466 712/216 |

(Continued)

OTHER PUBLICATIONS

Shubhendu S. Mukherjee, Mark D. Hill, "Using Prediction To Accelerate Coherence Protocols", Proceedings of the 25th annual international symposium on Computer architecture, Jun. 27-Jul. 2, 1998, 12 pages.

(Continued)

*Primary Examiner* — Michael Krofcheck
*Assistant Examiner* — William E. Baughman (57) ABSTRACT

A distributed shared-memory system includes several nodes that each have one or more processor cores, caches, local main memory, and a directory. Each node further includes predictors that use historical memory access information to predict future coherence permission requirements and speculatively initiate coherence operations. In one embodiment, predictors are included at processor cores for monitoring a memory access stream (e.g., historical sequence of memory addresses referenced by a processor core) and predicting addresses of future accesses. In another embodiment, predictors are included at the directory of each node for monitoring memory access traffic and coherence-related activities for individual cache lines to predict future demands for particular cache lines. In other embodiments, predictors are included at both the processor cores and directory of each node. Predictions from the predictors are used to initiate coherence operations to speculatively request promotion or demotion of coherence permissions.

20 Claims, 5 Drawing Sheets

(56) References Cited

U.S. PATENT DOCUMENTS

| | | |
|---|---|---|
| 2012/0084525 A1 | 4/2012 | Jegu et al. |
| 2014/0258622 A1* | 9/2014 | Lacourba ............ G06F 12/0862 |
| | | 711/122 |
| 2017/0181417 A1* | 6/2017 | Tsybulnyk ............. A01K 85/18 |
| 2017/0185351 A1 | 6/2017 | Guim Bernat et al. |

OTHER PUBLICATIONS

Non-Final Office Action dated Jul. 12, 2018 in U.S. Appl. No. 15/358,318, 9 pages.

\* cited by examiner

PROACTIVE CACHE COHERENCE

BACKGROUND

Description of the Related Art

Distributed shared-memory is a popular architecture in multiprocessing computing systems. The distributed shared-memory architecture includes multiple nodes within which processors and memory reside. The multiple nodes communicate via a network coupled there between. When considered as a whole, the memory included within the multiple nodes (which may include caches, main memory, etc.) forms the shared memory for the computing system. Typically, the computing system includes one or more directories to identify which nodes have cached copies of data corresponding to a particular address.

Many shared-memory computing systems use directory-based coherence protocols for the one or more directories to keep multiple caches coherent. In particular, a directory can include multiple entries, with each entry associated with a unique cache line and storing state information indicating the coherency state for the corresponding cache line. For example, a given entry of a directory can store the coherency state and an indicator of which processor(s)'s caches currently have cached copies of the cache line. Coherency protocols ensure coherence between all caches, by maintaining a consistent view of data in memory among the many caches in a shared-memory computing system.

To comply with a typical coherency protocol, a processor must obtain appropriate coherence permissions before accessing a memory address in cache-coherent systems. Accordingly, coherence activities, such as communications between caches or nodes for maintaining coherence between copies of cache lines, are performed in response to a memory access request initiated by a processor for any given cache line. The coherence activities must be completed before the memory access request can be completed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As discussed with respect to FIGS. 1-5 herein, maintaining cache coherence between various caches in a computing system requires that the coherence permissions for a cache line (i.e., permission for a requested data access, such as a load or store operation, to the cache line) be obtained by a processor before accessing any data within that line. This may require communicating with other processors in the system that may have cached copies of the data to update their coherence state and/or to obtain updated data that may reside in their caches. The requesting processor's memory access is stalled until such coherence communications are completed. Therefore, operations related to cache coherence can add delay to memory access times, resulting in performance overheads. Memory access times can be improved by predicting memory addresses that a processor is likely to request access to in the future and speculatively requesting coherence permissions before the processor makes its memory access request.

Predictors use historical memory access information (e.g., patterns and/or sequences of memory accesses) to predict future coherence permission requirements and speculatively initiate coherence operations. In some embodiments, predictors are included at processor cores for monitoring a memory access stream (e.g., historical sequence of memory addresses referenced by a processor core) and predicting addresses of future accesses. The predictor can further request coherence permissions speculatively for those predicted addresses. In another embodiment, predictors are included at the directories of each node for monitoring memory access traffic and coherence-related activities for individual cache lines to predict future demands for particular cache lines. The predictor can further initiate coherence operations to speculatively promote or demote coherence permissions of certain cores for particular cache lines.

In other embodiments, predictors are included at both the processor cores and directory of each node. Each of the two predictors has access to different data for predicting for future coherence permission requirements. For example, each predictor at a processor core monitors accesses coming out of the one particular processor core it is associated with to predict future accesses of that core independent of the operations of other cores, while predictors at the directories monitor memory access traffic and history of data sharing observed for each cache line from all cores in the system to predict future demand for specific, individual cache lines. Predictions from the two types of predictors can be combined to collaboratively initiate proactive coherence operations. Alternatively, the prediction and proactive coherence operations initiated by one type of predictor can filter or override predictions from the second type of predictor. The various predictors and future coherence permission predictions described herein are used to speculatively initiate coherence operations such that many memory accesses by processors will have reduced stall time waiting on coherence-related communications.

Figure 1:
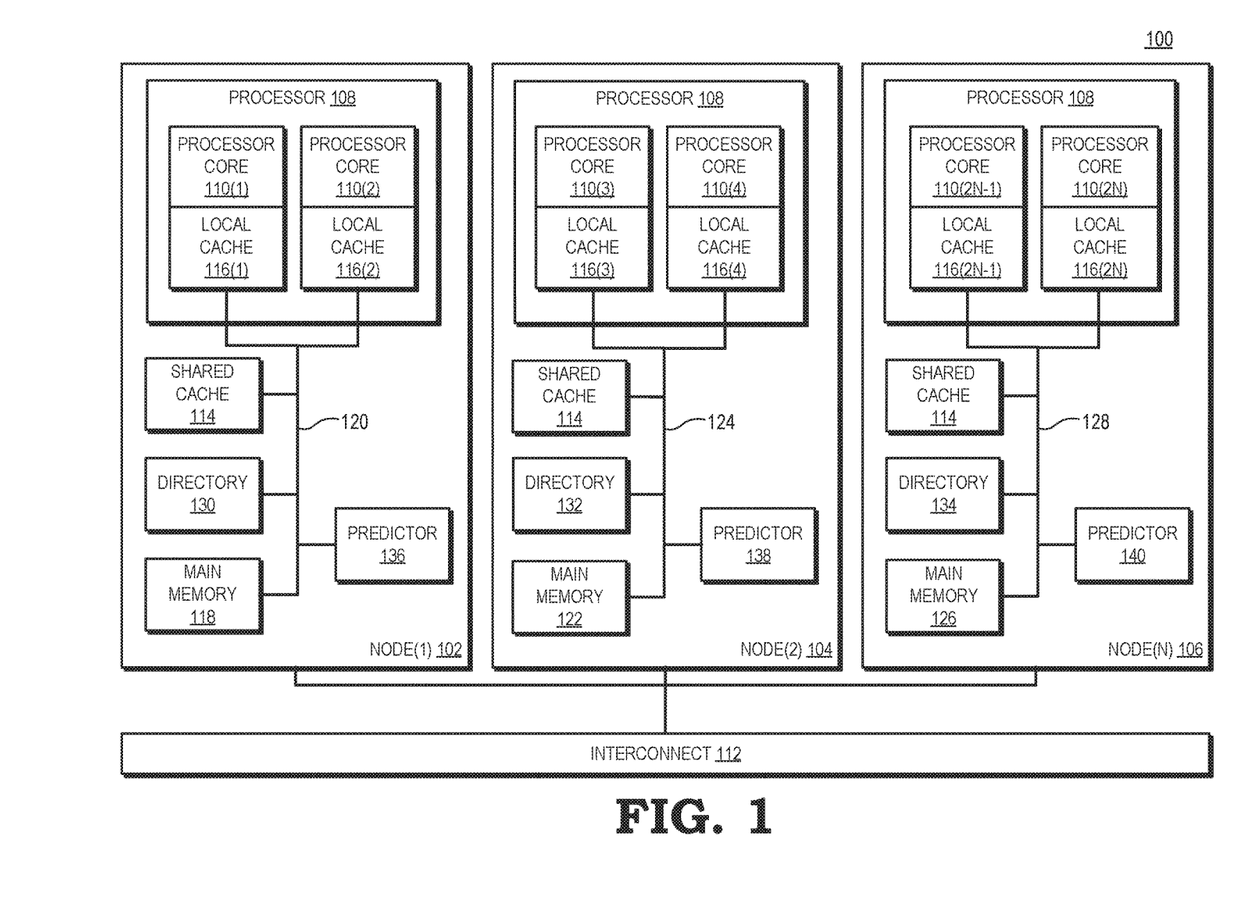
FIG. 1 is a block diagram of an example system for implementing proactive cache coherence operations according to some embodiments.

FIG. 1 is a block diagram illustrating an example of a system 100 with distributed shared-memory architecture for implementing proactive cache coherence operations according to some embodiments. The system 100 includes N number of nodes 102-106. Each node 102-106 can be any computing device, such as a server, a workstation, a desktop computer, a notebook computer, a tablet computer, an accelerated processing unit (APU), and the like. In FIG. 1, each node 102-106 includes a processor 108 having one or more processor cores 110, and a main memory 118, 122, and 126 for nodes 102, 104, and 106, respectively. Although FIG. 1 illustrates a single processor associated with each node, other embodiments can include nodes having more than one processor associated with each node.

The nodes 102-106 are connected together by an interconnect network 112. The interconnect network 112 can be implemented using any suitable electrical, optical or wireless technology, and can include any number of topologies, from dedicated point-to-point connections, to single switch implementations, to packet or circuit switched networks of varying complexity, or to any combination thereof. Thus, multiple nodes 102-106 can communicate via the interconnect network 112 coupled there between.

Each processor core 110 can be a processor core of a microprocessor, central processing unit (CPU), or the like. Some processor cores can be different processing cores of a processing device incorporated into a single integrated circuit. Other processor cores can be components of a multi-chip module (e.g., in which separate microprocessor dies are included within a single package). Alternatively, the processor cores can have distinct dies and packaging, and be connected via an interposer or other interface circuitry. Although the system 100 shown in FIG. 1 includes two processor cores 110 for each processor 108, persons of ordinary skill in the art having benefit of the present disclosure should appreciate that the number of processor cores in the system 100 is a matter of design choice. In some embodiments, the system 100 includes more than or fewer than the two processor cores 110 for each processor 108.

Each node 102-106 includes a shared main memory, one or more processor cores 110, and one or more levels of cache memory such as a shared cache 114 and one or more local caches 116. Data is generally transferred between main memory and caches in fixed-size data blocks called "cache lines." As used herein, "cache line" generally refers to a unit of memory. However, one of skill in the art will recognize that the scope of this disclosure is not limited to cache lines, and can also include any granularity of data or alternative unit of memory, such as blocks, pages, segments, etc. Each node may include caches in order to reduce memory latency or to filter memory accesses. Memory latency is defined as the elapsed time between a request for information stored in memory, such as a cache line, and the time the information is available to the requesting processor core. The elapsed time is measured in terms of clock cycles or in other units. Primary caches (i.e., those used to store most frequently used information by processor cores) are referred to generically herein as "local caches", whereas secondary caches (i.e., those used to store less frequently used information than a local cache, such as L2 caches, L3 caches, etc.) that are used to store at least some information that can be stored in the primary caches of two or more processor cores are referred to generically herein as "shared caches". Further, the local caches (e.g., L2 and L3 caches) can either be inclusive or exclusive relative to the L1 caches, wherein an exclusive cache does not cache any cache lines stored in higher-level caches (e.g., L1 cache) and an inclusive cache is able to cache lines stored in higher-level caches.

Each node 102-106 includes one or more local caches 116 that include a level one ("L1") cache, or other memory structure from which the processor cores 110 retrieve frequently accessed information quickly relative to other memory structures in the nodes. Each node 102-106 also includes a secondary cache memory (i.e., shared cache 114), such as a level two ("L2") cache memory, or other memory structure from which it retrieves less frequently accessed information less quickly than compared to a primary cache memory but faster than from the main memory, such as dynamic random access memory (DRAM), hard-drive memory, etc. The local caches 116 store information that is to be primarily used by the processor cores to which they correspond. The shared caches 114 can be used by more than one processor core. In some embodiments, the shared caches 114 can store all or some portion of information stored in each of the local caches 116, such that multiple local caches 116 store a subset of frequently used information stored in the shared cache memory. The caches 116 are utilized to temporarily store data from main memory when that data is being used by the processor cores 110. These caches 116 are often smaller in size, but significantly faster, than the main memory. The main memory can be shared between the nodes 102-106 and data stored within main memory is generally accessible to all processor cores 110 via request transactions issued on interconnect 112.

The processor cores 110 of each node are coupled to each other via a local bus. As shown in FIG. 1, node(1) 102 includes processor core 110(1) with its local cache 116(1) and processor core 110(2) with its local cache 116(2). Main memory 118 of node(1) 102 is coupled to the processor cores 110(1) and 110(2) via its local bus 120. Node(2) 104 includes processor core 110(3) with its local cache 116(3) and processor core 110(4) with its local cache 116(4). Main memory 122 of node(2) 104 is coupled to the processor cores 110(3) and 110(4) via its local bus 124. Similarly, each of the other nodes through node(N) 106 has processor cores 110(2N-1) and 110(2N) coupled to their respective main memories via a local bus (e.g., main memory 126 of node(N) 106 is coupled to processor cores 110(2N-1) and 110(2N) via local bus 128).

In some embodiments, such as illustrated in FIG. 1, main memory (e.g., main memories 118, 122, and 126) operate as the principal working storage for the system 100. Each address in the address space of the main memories is assigned to a single main memory, and the node that main memory belongs to is referred to as the "home node" of the address. In embodiments where the unit of main memory access is a cache line, all addresses within a cache line are typically assigned to the same home node. A processor within a different node than the home node may access the data at an address of the home node, potentially caching the data within its local cache. Data corresponding to addresses stored in remote nodes, as well as data corresponding to addresses stored in the memory of the same node, may be cached in any of the local caches 116 or within the shared cache 114 of each node. When considered as a whole, the main memory (e.g., main memory 118, 122, and 126) included within the multiple nodes (e.g., nodes 102-106) form the shared memory for the system 100.

The processor cores 110 of each node 102-106 execute instructions independently to one another. While each of the processor cores 110 may have some amount of integral memory, for example, in the form of a register file, such memory is typically limited in storage capacity. Accordingly, in order to execute instructions, the processor cores 110 store and retrieve data from the memory hierarchies of the system 100, including the local caches 116, shared caches 114, and main memories 118, 122, and 126. In particular, in the course of executing instructions, the processor cores 110 generate operations, referred to as memory access requests, to store (i.e., a write operation) data to or load (i.e., a read operation) data from the memory hierarchies.

The usage of multiple processors and/or multiple processor cores introduces complexity into cache management. Different instructions in the processor cores 110 accessing the same data each may have their own private copy of the data in their respective local caches 116. In order to avoid processing errors, the different copies of the data must be kept consistent, or "coherent." Accordingly, cache coherence protocols (e.g., MSI, MESI, MOSI, MOESI, MERSI, MESIF, etc.) are used by the system 100 to keep different caches synchronized. The controllers for the various caches (e.g., local caches 116) enforce the cache coherence protocol, thereby preserving the consistency of data shared across all memory associated with the various processors 108 within system 100.

To maintain memory coherence among the nodes, the system 100 includes a coherence directory (also known as a "probe filter") for each node. In one embodiment, the directories are decentralized (such as illustrated in FIG. 1), with each node 102-106 including a directory (e.g., directories 130-134 for nodes 1-N, respectively) that identifies which nodes have locally cached copies of data corresponding to a particular address in main memory. In some embodiments, the directory associated with each node only stores information about the cache lines for which it is the home node. In such an embodiment, the directories in all nodes collectively form a single, logical directory spanning the entire memory address space (i.e., a centralized directory). The directories maintain address and state information for cache lines by tracking the current sharers of a cache line in system 100. To this end, each directory 130-134 can be stored in static random-access memory (SRAM) in each node or can alternatively be a portion of the main memory (e.g., DRAM) that is reserved for directory purposes.

Coherency activities may be generated via examination of the directories 130-134. In some embodiments, a directory coherence protocol is utilized that relies on point-to-point messaging between nodes. In other embodiments, a coherence protocol is used that uses broadcast messages to nodes for coherence messages. Addresses are distributed across the nodes; each address is assigned to a home node that is responsible for ordering and handling all coherence requests to that address. Typically, the address distribution is done in a manner such that all addresses within each cache line map to the same home node. With directory protocols, cache line requests are routed through the home node. The home node has visibility of the owning cache for each cache line and communication patterns to the cache lines for the set of memory addresses tracked by the home node's directory.

Each entry in the directories 130-134 tracks information for a corresponding cache line that may be present in one of the shared caches 114 or local caches 116. The information stored at an entry in one of the directories 130-134 for its corresponding cache line includes, for example in directory caches, the physical address (or portion thereof) of the cache line as well as a coherency state of the cache line. In particular, each cache line is associated with coherency information, as governed by various cache coherence protocols, to indicate the coherency state of the cache line, as well as how the cache line may be handled under the rules of the coherence protocol.

In some embodiments, the processors 108 obtain coherence permissions before accessing a memory address in a cache-coherent system. The requesting of coherence permissions includes one or more of communicating to caches (e.g., local caches 116 or shared caches 114) that may have copies of the requested data in order to update their coherency states and/or to obtain updated data residing in the caches. Generally, for a memory access requested by a processor, a directory in the home node associated with the address of the memory access request will need to determine which caches have copies of the data, send coherence communications to the caches, and wait on responses from the caches before granting (or denying) coherence permission to the requesting processor. For example, for a memory access request by a processor for a write operation, obtaining coherence permissions can include communications to determine which caches have copies of the data to be updated (e.g., written). Cached copies of the data are invalidated before granting the requesting processor exclusive permission to write the data. The requesting processor's memory access is stalled until such coherence communications are completed. Waiting on the completion of cache coherence communications adds performance overhead to the operation of system 100.

As system 100 scales to include greater number of nodes, processors 108, and/or processor cores 110, cache coherence can add significant delays to the critical path of a memory access. As used herein, "critical path" refers to tasks or operations that must be completed before a memory access can proceed. Accordingly, coherence interactions such as waiting on the system's 100 coherence protocol to grant (or deny) permission to access a cache line will result in performance overheads. The performance of system 100 can be improved by removing performance overheads, such as those due to cache coherence operations, from the critical path of memory accesses. The more tasks or performance overheads that can be moved off the critical path of the memory access, the faster the memory access will be completed. This not only improves performance directly, but may also enable reduced hardware cost by making it easier to tolerate slower cache coherence implementations that may consume less area or power.

In some embodiments, the system 100 includes a coherence predictor at each node for performing speculative cache coherence operations. Rather than maintaining cache coherence on a demand-driven basis (e.g., when a processor core issues an instruction, the specified data is stored or fetched from memory; coherence permissions are only granted after the processor core attempts to access a memory location), each node 102-106 includes a coherence predictor (e.g., predictors 136-140 for nodes 1-N, respectively) that proactively initiates coherence operations, including both promotions of addresses that a processor core may need in the future and demotion of addresses that the processor core may no longer need. By predicting that a processor core may need access to data at a particular address, the system's 100 coherence protocol can speculatively obtain coherence permissions before the processor core requests access for read or write operations. In some embodiments, proactive coherence operations, such as predicting addresses of future accesses or speculatively requesting coherence permissions, do not involve the transfer of data stored at the predicted addresses (i.e., only the permissions to perform data accesses in the future are conferred).

The terms "proactive(ly)" and "speculative(ly)" are used interchangeably herein to generally refer to performing a task before it is known whether that task will actually need to be performed. In the context of the proactive coherence operations described herein, proactively/speculatively requesting coherence permissions generally refers to requesting coherence permissions for a cache line before it is known whether a processor will actually request access to that cache line, so as to prevent a delay that would otherwise have to be incurred due to waiting on coherence communications if the permissions are not requested until after the processor requests access to the cache line. Subsequently, if the processor initiates a request for that data at the particular address, the memory access operation can proceed without waiting for coherence interactions on the critical path (due to coherence permissions having already been granted from a prior speculative coherence permission request). In this manner, coherence permission operations can be performed speculatively so that at least a portion of coherence-related overheads can be eliminated from the critical path of memory accesses.

Figure 2:
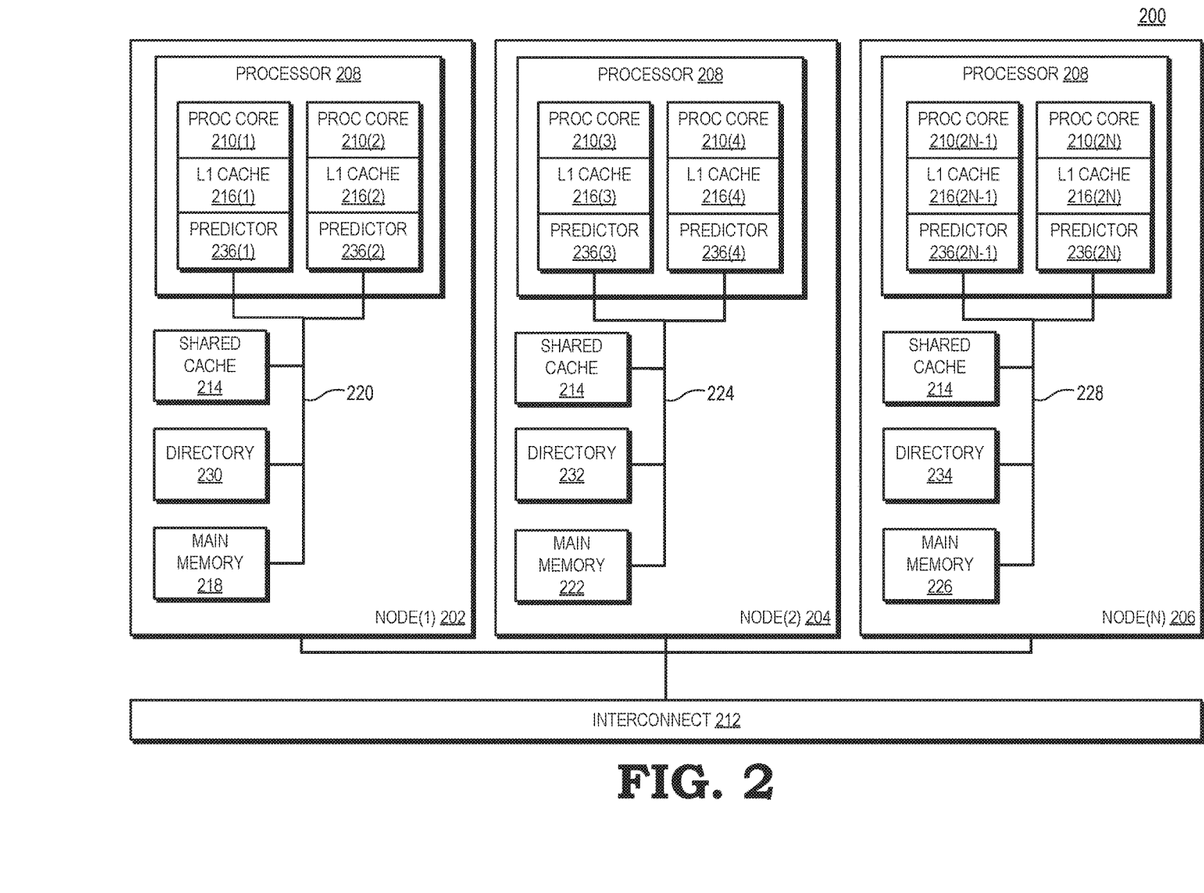
FIG. 2 is a block diagram illustrating an example of a system using processor core predictors for implementing proactive cache coherence operations according to some embodiments.

FIG. 2 is a block diagram illustrating a first example of a system 200 for implementing proactive cache coherence operations according to some embodiments. The system 200 includes N number of nodes 202-206. Each node 202-206 can be any computing device, such as a server, a workstation, a desktop computer, a notebook computer, a tablet computer, an accelerated processing unit (APU), and the like. In FIG. 2, each node 202-206 includes a processor 208 having one or more processor cores 210, and a main memory 218, 222, and 226 for nodes 202, 204, and 206, respectively. Although FIG. 2 illustrates a single processor associated with each node, other embodiments can include nodes having more than one processor associated with each node. Similarly, although the system 200 shown in FIG. 2 includes two processor cores 210 for each processor 208, persons of ordinary skill in the art having benefit of the present disclosure should appreciate that the number of processor cores in the system 200 is a matter of design choice. In some embodiments, the system 200 includes more than or fewer than the two processor cores 210 for each processor 208.

The nodes 202-206 are connected together by an interconnect network 212. The interconnect network 212 can be implemented using any suitable electrical, optical or wireless technology, and can include any number of topologies, from dedicated point-to-point connections, to single switch implementations, to packet or circuit switched networks of varying complexity, or to any combination thereof. Thus, multiple nodes 202-206 can communicate via the interconnect network 212 coupled there between.

Each node 202-206 includes a shared main memory, one or more processor cores 210, and one or more levels of cache memory such as a shared cache 214 and one or more local caches 216. Each node 202-206 includes one or more local caches 216 that include a level one ("L1") cache, or other memory structure from which the processor cores 210 retrieve frequently accessed information quickly relative to other memory structures in the nodes. Each node 202-206 also includes a secondary cache memory (i.e., shared cache 214), such as a level two ("L2") cache memory, or other memory structure from which it retrieves less frequently accessed information less quickly than compared to a primary cache memory but faster than from the main memories 218, 222, and 226.

The processor cores 210 of each node are coupled to each other via a local bus. As shown in FIG. 2, node(1) 202 includes processor core 210(1) with its local cache 216(1) and processor core 210(2) with its local cache 216(2). Main memory 218 of node(1) 202 is coupled to the processor cores 210(1) and 210(2) via its local bus 220. Node(2) 204 includes processor core 210(3) with its local cache 216(3) and processor core 210(4) with its local cache 216(4). Main memory 222 of node(2) 204 is coupled to the processor cores 210(3) and 210(4) via its local bus 224. Similarly, each of the other nodes through node(N) 206 has processor cores 210(2N−1) and 210(2N) coupled to their respective main memories via a local bus (e.g., main memory 226 of node(N) 206 is coupled to processor cores 210(2N−1) and 210(2N) via local bus 228).

The system 200 includes a coherence directory (also known as a "probe filter") for each node to maintain memory coherence among the nodes. As illustrated in FIG. 2, each node 202-206 includes a directory (e.g., directories 230-234 for nodes 1-N, respectively) that identifies which nodes have locally cached copies of data corresponding to a particular address in main memory. In one embodiment, the directory of a node holds sharer information for all cache lines that reside in the main memory of that node. In system 200, directory 230 holds sharer information for cache lines that reside in main memory 218 of node(1) 202. Directory 232 holds sharer information for cache lines that reside in main memory 222 of node(2) 204. Similarly, each of the other nodes through node(N) 206 includes a directory for holding cache line information (e.g., directory 234 holds sharer information for cache lines that reside in main memory 226 of node(N) 206). In this manner, the directories 230-234 maintain address and state information for cache lines by tracking the current sharers of a cache line in system 200. The directories 230-234 also mediate the generation of coherence messages and the transfer of coherence permissions among cores that share data.

In some embodiments, the system 200 includes a coherence predictor associated with each processor core 210 (e.g., predictors 236(1)-236(2N) for processor cores 210(1)-210(2N), respectively) for performing speculative cache coherence operations. In various embodiments, the coherence predictors 236 are implemented as prediction hardware located at or associated with their respective processor cores 210. The predictors 236 have visibility into a memory access stream (e.g., memory access information and, in some embodiments, program counter values associated with each memory access) generated by their respective processor cores 210. For example, predictor 236(1) monitors memory access requests generated by its associated processor core 210(1). The memory access history (e.g., patterns and/or sequences of memory accesses) of processor core 210(1) is processed at predictor 236(1) for predicting memory address (es) containing an instruction or data block that the processor core 210(1) may need in the future.

The predictor 236(1) makes its predictions of the processor core's 210(1) future coherence permission requirements and initiates proactive coherence operations by speculatively requesting permission for future reads and/or writes. The predictor 236(1) does not initiate any access to the data at the predicted memory addresses but rather speculatively requests coherence permissions such that future memory access attempts by the processor core 210(1) can proceed without waiting on coherence operations (e.g., obtaining permission from the coherence protocol for reads/writes) that would otherwise delay completion of the memory access.

By initiating the necessary coherence transactions before the processor core 210(1) attempts the access or needs the data, the predictor 236(1) is able to promote or demote coherence permissions of the processor core 210(1) for certain memory addresses. If it is predicted that processor core 210(1) may need access to data at a particular address, the system's 200 coherence protocol can promote or demote the coherence state of a cache line associated with the particular address. As an example, for a predicted write operation to a memory address that is already cached in a shared state in L1 cache 216(1) associated with core 210(1), the coherence protocol (e.g., MESI protocol or any other similar cache coherence protocol known to those skilled in the art) will determine which other caches have copies of the data associated with the memory address and promote the corresponding cache line in L1 cache 216(1) to an exclusive state (i.e., copy of the data in the cache line can be modified/need not match main memory and is guaranteed to be the only cached copy) while invalidating all other cached copies. Subsequently, if the predicted write operation is executed, the processor core 210(1) can write to the cache line to complete the memory access without waiting on coherence-related operations. If the cache line had not been speculatively promoted to an exclusive state and remained in a shared state, a memory access that writes to a cache line in the shared state would change the coherence state of the cache line to modified, which would require invalidating any copies of the cache line in other caches before the memory access is considered complete. If a copy of the cache line containing the memory address predicted to be written by core 210(1) in the above example was not present in the L1 cache 216(1), in one embodiment, the predictor invalidates other cached copies but does not allocate the cache line in L1 cache 216(1). In another embodiment, in this scenario, in addition to invalidating the other cached copies, a copy of the cache line containing the address in question is allocated in the L1 cache 216(1) in an exclusive state.

If it is predicted that processor core 210(1) will no longer need access to data at a particular address, the system's 200 coherence protocol can demote the coherence state of a cache line associated with the particular address, which may open up the cache line to be freely accessed by other processor cores. In this manner, the use of predictors 236 at the processor cores 210 to proactively initiate coherence operations enables the requesting and/or relinquishing of coherence permissions before those coherence operations are required by memory access operations issued by the cores associated with the predictors or other cores, which removes performance overhead associated with coherence-permission-related activities from the critical path of memory accesses. Subsequently, memory access operations can proceed without waiting for coherence interactions on the critical path (due to coherence permissions having already been granted from the prior speculative coherence permission request), thereby reducing the latency of memory access operations by removing the need to wait for appropriate coherence permissions to be obtained.

In various embodiments, the predictors 236 can include a number of different history-based, micro-architectural predictors at the processor cores 210 to make predictions about future memory accesses and perform coherence operations speculatively. In one embodiment, the predictors 236 include address-based predictors to apply coherence prediction operations at the processor cores 210. For example, the address-based predictors can include a next-line predictor that monitors an address stream (e.g., historical sequence of memory addresses referenced by a processor core) at a processor core 210 to determine if the processor core 210 is accessing memory addresses in an identifiable pattern. For example, if the accessed addresses increment sequentially, it can be predicted that the processor core 210 is progressing through cache lines linearly, and based on that prediction, the next-line predictor can speculatively request coherence permissions of the same type as previous accesses (e.g., reads or writes) for the next N-number of sequential addresses. It will be appreciated by those skilled in the art that N can be a design-time or run-time parameter, and that the scope of this disclosure can include the speculative requesting of coherence permissions for any number of cache lines. Further, those skilled in the art will recognize that the next-line predictor is not limited to sequential addresses and can detect other linear patterns (e.g., strides) or non-linear patterns between memory addresses in the address stream.

The address-based predictors include a Markov predictor that uses address stream data to train Markov models based on the addresses of previous memory accesses. The Markov models can use the past N-number of address values to predict the memory addresses of future accesses. The address-based predictors can also include a region predictor that monitors regions of memory (e.g., a set of cache lines in a particular region of memory) and identifies whether an access pattern of addresses in a specific region of memory can be identified. If multiple accesses are detected to a region of memory, it can be predicted that other nearby memory locations in the same region will also be accessed. Accordingly, coherence permissions can be speculatively requested for entire regions of memory based on the region predictor. Further, the region predictor can also determine that other regions of memory have not been accessed and can proactively demote coherence permissions for those regions.

In another embodiment, the predictors 236 includes program counter (PC), also known as the instruction pointer, based predictors to apply coherence prediction operations at the processor cores 210. For example, the PC-based predictors can include a stride predictor that monitors the sequence of addresses accessed by repeated invocations of a given load/store instruction (i.e., at the same program counter location). The stride predictor keeps track of not only the last address referenced by a load, but also the difference between the last address of the load and the address before that, referred to as the "stride." If a fixed or deterministic stride can be identified by the stride predictor, the addresses of one or more future accesses can be predicted for proactively requesting coherence permissions.

In other embodiments, the predictors 236 can also include a run-ahead-execution predictor or a content-directed predictor for applying coherence prediction operations at the processor cores 210. The run-ahead-execution predictor proceeds faster than normal execution at the processor cores and pre-processes instructions to compute memory addresses that will be targeted upon execution of the instructions. The run-ahead-execution predictor does not perform actual memory accesses, but instead scouts ahead of the main thread of execution (or predicted path of execution) to compute memory addresses of future memory accesses for proactively requesting coherence permissions. The content-directed predictor analyzes contents of previous memory accesses to predict whether certain data accessed from memory may be addresses (i.e., "pointers") that will be dereferenced in the future. If so, coherence permissions for dereferencing those addresses can be speculatively requested.

Those skilled in the art will recognize that the predictors described herein are provided as a non-exhaustive set of example embodiments. Other predictors implementing algorithms or techniques for predicting addresses of future accesses and/or speculatively requesting coherence permissions can be implemented without departing from the scope of this disclosure. In some embodiments, one or more of the above-described predictors 236 can be combined at the same processor core 210 to provide various predictions on the address stream of the same processor core 210. In other embodiments, one or more of the above-described predictors 236 can be used at different points in time or concurrently within the same system. In such cases, some embodiments may apply different techniques to different regions of memory depending on access patterns or other criteria.

Figure 3:
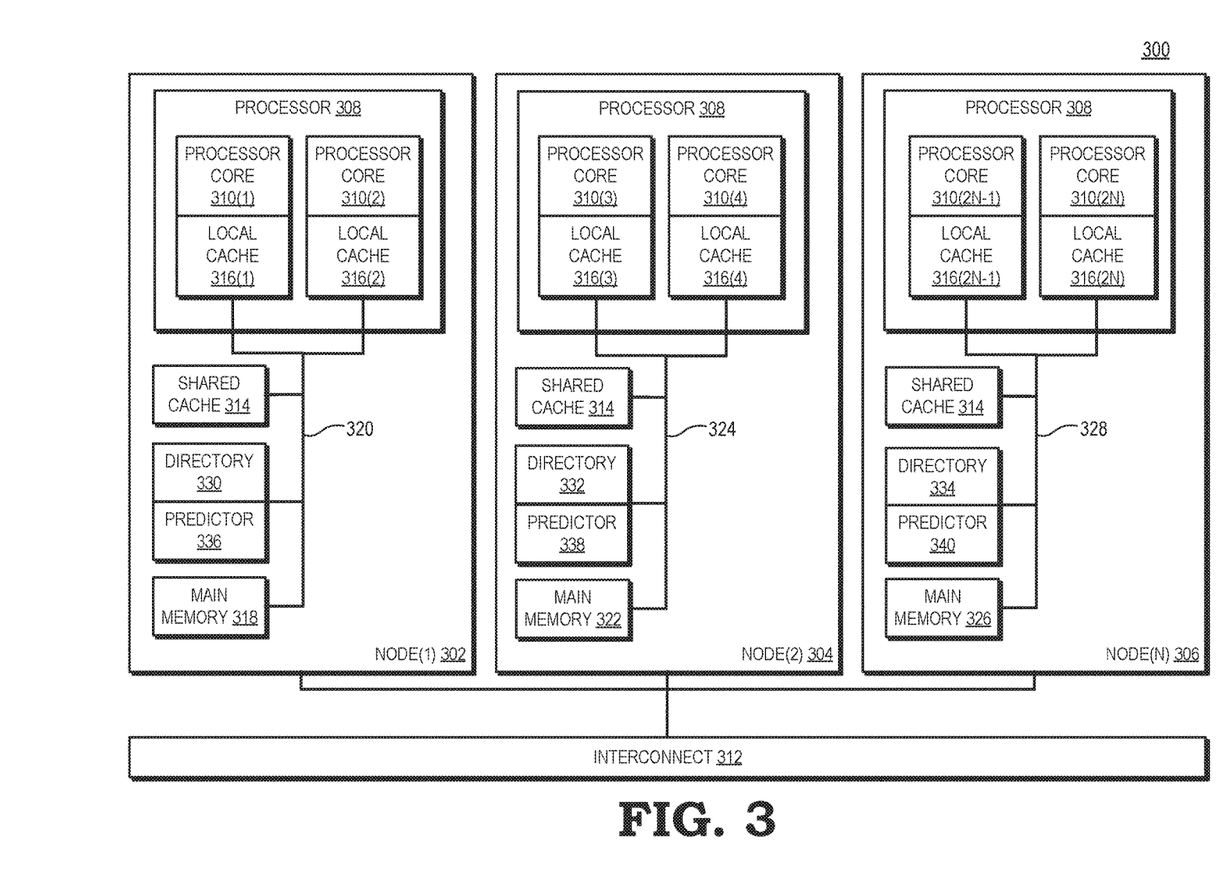
FIG. 3 is a block diagram illustrating an example of a system using directory predictors for implementing proactive cache coherence operations according to some embodiments.

FIG. 3 is a block diagram illustrating a second example of a system 300 for implementing proactive cache coherence operations according to some embodiments. The system 300 includes N number of nodes 302-306. In FIG. 3, each node 302-306 includes a processor 308 having one or more processor cores 310, and a main memory 318, 322, and 326 for nodes 302, 304, and 306, respectively. The processor cores 310 of each node are coupled to each other within the same via local buses 320, 324, and 328, respectively. The nodes 302-306 are connected together by an interconnect network 312. Thus, multiple nodes 302-306 can communicate via the interconnect network 312 coupled there between.

Each node 302-306 includes a shared main memory, one or more processor cores 310, and one or more levels of cache memory such as a shared cache 314 and one or more local caches 316. Each node 302-306 includes one or more local caches 316 that include a level one ("L1") cache, or other memory structure from which the processor cores 310 retrieve frequently accessed information quickly relative to other memory structures in the nodes. Each node 302-306 also includes a secondary cache memory (i.e., shared cache 314), such as a level two ("L2") cache memory, or other memory structure from which it retrieves less frequently accessed information less quickly than compared to a primary cache memory but faster than from the main memories 318, 322, and 326.

The system 300 includes a coherence directory for each node to maintain memory coherence among the nodes. As illustrated in FIG. 3, each node 302-306 includes a directory (e.g., directories 330-334 for nodes 1-N, respectively) that identifies which nodes have locally cached copies of data corresponding to a particular address in main memory. The directory of a node holds sharer information for all cache lines that reside in the main memory of that node. Any given directory within a node keeps track of the main memory on that node. In system 300, directory 330 holds sharer information for cache lines that reside in main memory 318 of node(1) 302. Directory 332 holds sharer information for cache lines that reside in main memory 322 of node(2) 304. Similarly, each of the other nodes through node(N) 306 includes a directory for holding cache line information (e.g., directory 334 holds sharer information for cache lines that reside in main memory 326 of node(N) 306). In this manner, the directories 330-334 maintain address and state information for cache lines by tracking the current sharers of a cache line in system 300. The directories 330-334 also mediate the generation of coherence messages and the transfer of coherence permissions among cores that share data.

In some embodiments, the system 300 includes a coherence predictor associated with each directory (e.g., predictors 336, 338, and 340 for directories 330, 332, and 334, respectively) for performing speculative cache coherence operations. In various embodiments, the coherence predictors 336-340 are implemented as prediction hardware, located at or associated with their respective directories. The predictor 336-340 at each directory monitors accesses to addresses tracked by that directory to initiate proactive cache coherence operations. For example, predictor 336 monitors accesses from all processor cores 310 to addresses tracked by directory 330. Directory 330 of node(1) holds sharer information for all cache lines that reside in the main memory 318 of node(1).

Due to the requirement that access requests to main memory 318 of node(1) need to be sent to directory 330 first, the directory 330 is able to observe memory access traffic coming from all processor cores 310 for data that node(1) is responsible for. Although directory 330 has visibility for memory access and coherence-related activity, this access information is not stored at directory 330. For example, if a processor core (e.g., any of processor cores 310) attempts to access a cache line from main memory 318 of node(1) for which it does not have coherence permissions, a request is generated to directory 330 that requests the necessary coherence permissions to access the cache line. Directory 330, upon receiving the coherence permission request, generates any necessary coherence messages to other processor cores whose caches may already have copies of the cache line, informing them to adjust or relinquish their permissions to be consistent with the new memory access request. Accordingly, directory 330 is able to observe the state of a particular cache line (i.e., how many and what type of sharers already exist), which caches have shared copies of the particular cache line, the processor cores accessing the particular cache line, sharing patterns for the particular cache line, etc. Directory 330 does not track historical access information, but instead only maintains a current view of the system 300 (e.g., what caches have copies of which cache lines).

The memory access and coherence-related activity observed at directory 330 is tracked or stored at predictor 336 for informing predictions of future access information for cache lines associated with main memory 318. In contrast to processor core predictors (e.g., predictors 236 of FIG. 2) which monitor accesses coming out of one particular processor core to predict future accesses independent of the operations of other cores, directory predictors (e.g., predictors 336-340) are able to monitor memory access traffic from all cores and gauge demand for specific cache lines. Accordingly, the predictor 336 can determine which addresses and cache lines are heavily shared, contended, less accessed, or possibly not accessed at all. Predictor 336 can proactively initiate coherence operations, based on the historical access information, to speculatively promote or demote coherence permissions of certain cores for certain addresses, as discussed further herein.

In one embodiment, the predictor 336 tracks sharing patterns of cache lines by storing the coherence permission history of each individual cache lines. For a given individual cache line, an example coherence permission history can read as follows: first read by processor core 310(1), then written by processor core 310(N) after X-number of clock cycles, then read again by processor core 310(1) after Y-number of clock cycles, then written again by processor core 310(N) after X-number of clock cycles, etc. Once sufficient coherence permission history is tracked for an individual cache line to predict some type of sharing pattern, the coherence permissions granted to a processing core for that individual cache line may be revoked (e.g., by sending a demotion request) after the predicted number of cycles in preparation for another core requiring access to the cache line. Additionally, based on predicted sharing patterns from predictor 336, coherence permissions may be granted to another core (e.g., by sending a promotion request) after the predicted number of cycles in preparation for a predicted access to the cache line.

For example, the predictor 336 can use the example coherence permission history above to predict that processor cores 310(1) and 310(N) will require access to the cache line in alternating X- and Y-number of clock cycles. Accordingly, after the cache line is read by processor core 310(1), coherence permissions can be speculatively revoked for processor core 310(1) within X-number of clock cycles in anticipation of a write by processor core 310(N). Additionally, after the cache line is read by processor core 310(1), coherence permissions can be speculatively granted to processor core 310(N) in anticipation for its predicted write. Similarly, after the cache line is written by processor core 310(N), coherence permissions can be speculatively revoked for processor core 310(N) and/or speculatively granted to processor core 310(1) within Y-number of clock cycles in anticipation of a predicted read by processor core 310(1).

In another embodiment, predictor 336 at directory 330 can proactively demote coherence permissions for a number of cache lines in each memory region shared among multiple processor cores at various time intervals to determine the typical lifetime of granted coherence permissions in that region of memory. For example, for a given region in main memory 318, predictor 336 will proactively demote coherence permissions for a subset of the cache lines in the region after a predicted time of Y-number of clock cycles. If none of the multiple processor cores subsequently request coherence permissions to access those cache lines, it can be predicted that the processor cores also no longer need access to other addresses in the given region. Accordingly, the predictor 336 can proactively demote coherence permissions for larger portions of that given region in main memory 318 (e.g., a larger subset of cache lines up to the entirety of the cache lines in the given region).

Based on the above determination that the lifetime of granted coherence permissions in that region of memory is no higher than Y-number of cycles, the predictor 336 at directory 330 can proactively demote coherence permissions for the subset of the cache lines in the region shared among multiple processor cores after a predicted lifetime of a shorter, X-number of clock cycles. This process can be iteratively repeated with an increasingly shorter predicted lifetime until the speculative permission demotions result in subsequent coherence permission requests indicating that coherence permissions for cache lines in that region are still required. Based on a determination that the predicted lifetime of granted coherence permissions in the memory region has been underestimated (e.g., coherence permissions being requested for recent proactively demoted cache lines), the predictor 336 at directory 330 can proactively demote coherence permissions for the subset of the cache lines in the region shared among multiple processor cores after a predicted lifetime of a slightly longer, Z-number of clock cycles. This process can be iteratively repeated with an increasingly longer predicted lifetime until the predictor 336 determines the proper lifetime of granted coherence permissions in that region of memory.

In yet another embodiment, predictor 336 at directory 330 tracks the request patterns of coherence permission requests. For example, if predictor 336 observes that processor core 310(1) issues one or more read-only requests followed by an exclusive write request to a given cache line without any intervening requests from other processor cores to the given cache line, the predictor 336 can proactively promote the coherence state of the cache line when or after a subsequent read-only request from processor core 310(1) is issued in anticipation of a predicted exclusive write request.

Those skilled in the art will recognize that the directory predictors described herein are provided as a non-exhaustive set of example embodiments. Other predictors implementing algorithms or techniques for analyzing local access patterns (e.g., patterns of access from all processor cores to a particular cache line in local main memory) and/or speculatively granting or revoking coherence permissions to various processor cores can be implemented without departing from the scope of this disclosure. In some embodiments, such directory predictors proactively grant/revoke coherence permissions based on contention for data. If a cache line is heavily shared or contended, directory predictors can revoke (or grant) coherence permissions after a period of time in anticipation that some other cache will soon need to access that cache line. The aggressiveness of predictors at revoking coherence permissions can be adjusted, such as by scaling back the quickness or increasing the requirements for revoking coherence permissions if processor core requests coherence permissions for a cache line immediately after the predictor demotes the processor core's permissions for that cache line (i.e., the predictor incorrectly demoted the processor core's permissions prematurely).

Figure 4:
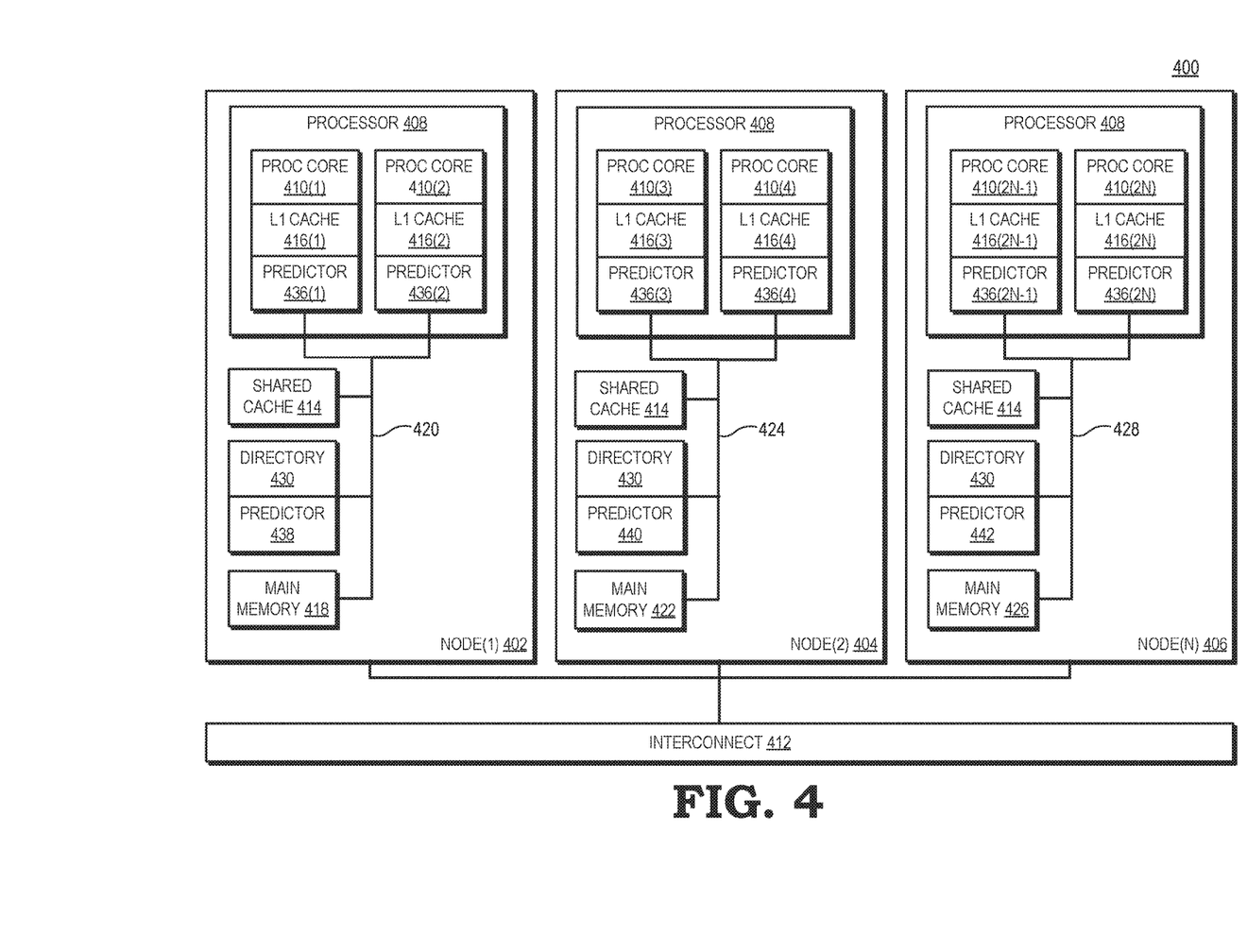
FIG. 4 is a block diagram illustrating an example of a system using processor core predictors and directory predictors for implementing proactive cache coherence operations according to some embodiments.

FIG. 4 is a block diagram illustrating a third example of a system 400 for implementing proactive cache coherence operations according to some embodiments. The system 400 includes N number of nodes 402-406. In FIG. 4, each node 402-406 includes a processor 408 having one or more processor cores 410, and a main memory 418, 422, and 426 for nodes 402, 404, and 406, respectively. The processor cores 410 of each node are coupled to each other within the same via local buses 420, 424, and 428, respectively. The nodes 402-406 are connected together by an interconnect network 412. Thus, multiple nodes 402-406 can communicate via the interconnect network 412 coupled there between.

Each node 402-406 includes a shared main memory, one or more processor cores 410, and one or more levels of cache memory such as a shared cache 414 and one or more local caches 416. Each node 402-406 includes one or more local caches 416 that include a level one ("L1") cache, or other memory structure from which the processor cores 410 retrieve frequently accessed information quickly relative to other memory structures in the nodes. Each node 402-406 also includes a secondary cache memory (i.e., shared cache 414), such as a level two ("L2") cache memory, or other memory structure from which it retrieves less frequently accessed information less quickly than compared to a primary cache memory but faster than from the main memories 418, 422, and 426.

The system 400 includes a coherence directory for each node to maintain memory coherence among the nodes. As illustrated in FIG. 4, each node 402-406 includes a directory (e.g., directories 430-434 for nodes 1-N, respectively) that identifies which nodes have locally cached copies of data corresponding to a particular address in main memory. The directory of a node holds sharer information for all cache lines that reside in the main memory of that node. Any given directory within a node keeps track of the main memory on that node. In system 400, directory 430 holds sharer information for cache lines that reside in main memory 418 of node(1) 402. Directory 432 holds sharer information for cache lines that reside in main memory 422 of node(2) 404. Similarly, each of the other nodes through node(N) 406 includes a directory for holding cache line information (e.g., directory 434 holds sharer information for cache lines that reside in main memory 426 of node(N) 406). In this manner, the directories 430-434 maintain address and state information for cache lines by tracking the current sharers of a cache line in system 400. The directories 430-434 also mediate the generation of coherence messages and the transfer of coherence permissions among cores that share data.

The system 400 includes a processor core predictor associated with each processor core 410 (e.g., processor core predictors 436(1)-436(2N) for processor cores 410(1)-410(2N), respectively) for performing speculative cache coherence operations. In various embodiments, the processor core predictors 436 are implemented as prediction hardware, located at or associated with their respective processor cores 410, such as discussed above with respect to FIG. 2. The system 400 further includes a directory predictor associated with each directory (e.g., directory predictors 438, 440, and 442 for directories 430 of nodes(1)-(N), respectively) for performing speculative cache coherence operations. In various embodiments, the directory predictors 438-442 are implemented as prediction hardware, located at or associated with their respective directories, such as discussed above with respect to FIG. 3.

The processor core predictors 436 and directory predictors 438-442 each has access to different data for generating predictions for future coherence permission requirements, and can be operated collaboratively to initiate proactive coherence operations. Alternatively, the prediction and proactive coherence operations initiated by one type of predictor filters or overrides predictions from the second type of predictor, such as described below and in further detail with respect to FIG. 5.

In some embodiments, predictions and proactive coherence operations initiated by the directory predictors 438-442 take precedence over predictions from the processor core predictors 436. For example, if processor core predictor 436(1) predicts a future access for a cache line in main memory 422 of node(2) 404, a speculative coherence permission promotion request is generated by the processor core predictor 436(1) to directory 430 of node(2). The future access prediction is based only on the historical sequence of memory addresses referenced by processor core 410(1) in node (1) (or other processor core related information as discussed in FIG. 2), and is further predicted independently from consideration of the operations of other processor cores or memory access traffic patterns to the cache line of the predicted future access. Accordingly, if directory predictor 440 at node(2) determines that the cache line associated with the speculative coherence permissions request is highly shared or heavily contended, the directory 430 of node(2) will deny the speculative coherence permission promotion request and send a negative acknowledgement back to the processor core predictor 436(1). In this manner, the directory 430 prevents the speculative granting of coherence permissions and forces the processor core 410(1) to re-request the necessary coherence permissions when it is actually performing the memory access (i.e., not speculatively, at which point the directory 430 will have no option but to obey the coherence permission request).

In other embodiments, predictions and proactive coherence operations initiated by the processor core predictors 436 take precedence over predictions from the directory predictors 438-442. For example, based on its observations of the memory access patterns to a cache line, directory predictor 438 can determine that the cache line is heavily contended and request a predicted demotion for the cache line at processor core 410(3), which currently has coherence permissions, to relinquish that permission. However, the predicted demotion is based only the access contention observed at directory 430 of node(1) and does not take into consideration future memory accesses that processor core 410(3) may have planned or predicted. Accordingly, if the processor core predictor 436(3) predicts that processor core 410(3) will need its coherence permissions for the cache line in the near future, the processor core 410(3) will decline to relinquish its coherence permissions and will instead send a negative acknowledgement back to the directory predictor 438.

In various embodiments, granting of coherence permission to a predicted, speculative coherence permission request is optional. The recipient of the speculative coherence permission request can be allowed to determine whether it will obey the request to grant permission or reject the request. If the request is rejected, a coherence message returned back to the requestor includes the inclusion of a negative acknowledgement (NACK) message indicating that a predicted, speculative coherence permission request is denied (i.e., a NACK message, identifying the request, is sent to the requestor of a speculative coherence operation if the recipient denies the request).

In order to enable the recipient overriding of predicted coherence operations, the systems described herein must be able to differentiate predicted proactive coherence permission requests (e.g., which may be denied) from required coherence operations (e.g., which cannot be denied). Therefore, coherence messages include the inclusion of a "predicted" flag (e.g., a single bit which may be asserted to indicate predictive coherence status or deasserted to indicate non-predictive coherence status) for differentiating optional speculative coherence permission requests from required coherence operations. In systems where predicted coherence requests can be distinguished from non-predictive coherence requests, the handling of predicted requests may receive lower priority than non-predicted requests in receiving service at various hardware resources, including cache coherence controllers and interconnect routers.

Those skilled in the art will recognize that the predictors described herein are provided as a non-exhaustive set of example embodiments. Other predictors can be implemented without departing from the scope of this disclosure. For example, in some alternative embodiments, predictors can be associated with last-level caches (e.g., shared caches 114 as described in FIGS. 1-4) to initiate proactive coherence operations based on the collective cache miss sequences of all processor cores that share the last-level caches. Further, although directories typically keep track of information regarding which processor cores' caches contain copies of what data for the node in which it physically resides, alternative embodiments include the directory of each node capable of tracking the full shared memory space of the entire system. Accordingly, the directory of each node could be aware of the states of cache lines residing in other nodes and memory access patterns for those cache lines.

Figure 5:
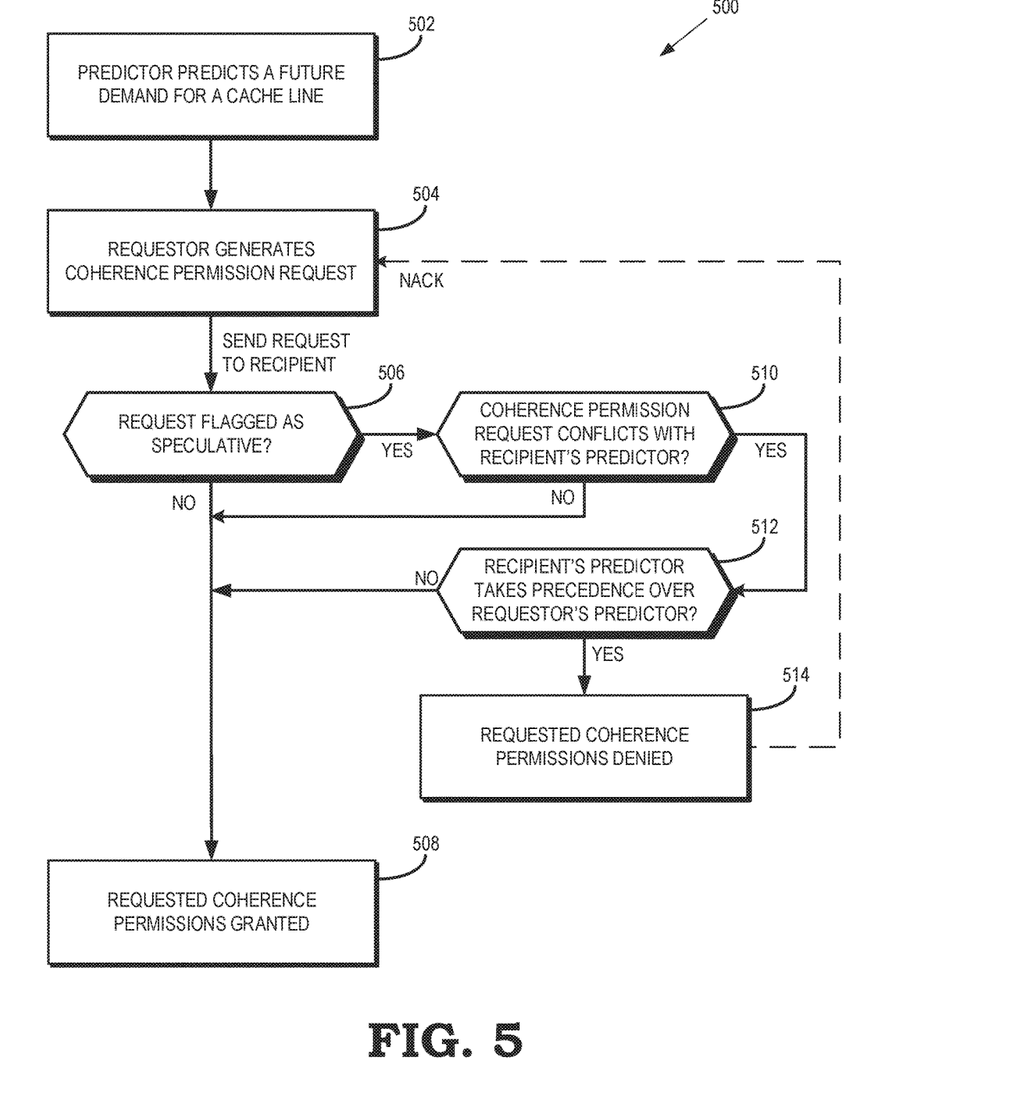
FIG. 5 is a flow diagram illustrating a method of proactively performing cache coherence operations using history-based predictors according to some embodiments.

FIG. 5 is a flow diagram illustrating a method 500 of speculatively performing cache coherence operations using history-based predictors, such as using the systems of FIGS. 1-4, according to some embodiments.

At block 502, a future demand for a cache line is predicted by a predictor in a processing node. In one embodiment, such as described relative to FIG. 2, the predictor is a processor core predictor (e.g., predictors 236 in FIG. 2) included at the processor core of the processing node for monitoring a memory access stream (e.g., historical sequence of memory addresses referenced by a processor core). Each processor core predictor monitors accesses coming out of one particular processor core and identifies patterns in the sequence of memory addresses to predict the addresses of future accesses (i.e., future demand for a cache line) independent of the operations of other cores. In another embodiment, such as described relative to FIG. 3, the predictor is a directory predictor (e.g., predictors 336-340 in FIG. 3) included at the directory of each processing node for monitoring memory access traffic and coherence-related activities observed for each individual cache lines tracked by the directory of that node to predict future demands for particular cache lines by certain cores. In other embodiments, such as described relative to FIG. 4, predictors are included at both the processor cores and directory of each node for predicting future coherence permission requirements.

At block 504, a speculative coherence permission request can be generated, based on the predicted future demand for a cache line and its coherence permission requirements, and communicated to a recipient to speculatively request a change in coherence permissions. For example, for memory address(es) containing a cache line that a processor core is predicted will need access to in the future, the processor core predictor (i.e., requestor) will generate and communicate a speculative coherence permission request to a directory in the node responsible for the cache line (i.e., recipient). Alternatively, for a cache line that is predicted to be subject to a future demand by a directory predictor, the director predictor (i.e., requestor) will generate and communicate a speculative coherence permission request to a processor core holding a cached copy of the cache line (i.e., recipient) to ask the processor core to adjust or relinquish its coherence permissions. In some embodiments, the speculative coherence permission request is a coherence message that includes an identifier to flag the coherence permission request as speculative. This allows the recipient to distinguish between predicted, speculative permission requests (e.g., which may be denied) and non-predictive, required coherence operations for actual memory accesses (e.g., which must be obeyed).

At block 506, the recipient examines the received coherence permission request to determine whether it has been explicitly annotated as being a predicted coherence request (e.g., flagged as being speculative using an identifier bit in the coherence message). If not, the coherence permission request would have been generated for a non-predictive coherence operation, or for a speculative permission request from either a processor-core-predictor-based system (e.g., FIG. 2) or a directory-predictor-based system (e.g., FIG. 3) in an embodiment that does not deny speculative coherence requests. Accordingly, the method 500 proceeds to block 508 and the requested coherence permissions are granted. Such coherence permissions can include the speculative promoting or demoting of coherence permissions of certain cores for particular cache lines, such as described herein relative to FIGS. 2-3.

If the coherence permission request is flagged as being speculative, the coherence permission request would have been generated for a speculative permission request from a system that includes both the processor core predictors and directory predictors (e.g., FIG. 4). Predictions from the two types of predictors can be combined to collaboratively initiate proactive coherence operations. Alternatively, the prediction and proactive coherence operations initiated by one type of predictor can filter or override predictions from the second type of predictor.

Accordingly, the method 500 proceeds from block 506 to block 510, where it is determined whether the speculative coherence permission request conflicts with a future demand for the cache line, as predicted by the recipient's predictor. As discussed herein relative to FIG. 4, the prediction and proactive coherence operations initiated by one type of predictor can filter or override predictions from the second type of predictor. For example, in some embodiments, predictions and proactive coherence operations initiated by the directory predictors 438-442 take precedence over predictions from the processor core predictors 436. In other embodiments, predictions and proactive coherence operations initiated by the processor core predictors 436 take precedence over predictions from the directory predictors 438-442.

If the speculative coherence permission request from the requestor does not conflict with predictions of the recipient, the method proceeds to block 508 and the requested coherence permissions are granted. If the speculative coherence permission request from the requestor conflicts with predictions of the recipient, the method proceeds to block 512, where it is determined whether predictions and proactive coherence operations initiated by the requestor take precedence over predictions from the recipient's predictor. If the requestor's predictions take precedence, the method proceeds to block 508 and the requested coherence permissions are granted. If the recipient's predictions take precedence, the method proceeds to block 514, where the recipient declines to grant the speculative coherence permissions and returns a negative acknowledgement back to the requestor. The negative acknowledgement informs the originator of the predicted coherence permission request (i.e., requestor) that the speculative request was denied and that the requestor should wait until it actually needs memory access to re-request coherence permissions (i.e., coherence permission requests are no longer speculative).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
monitoring, at a predictor, a history of memory access information associated with one or more cache lines;
predicting, at the predictor, a first prediction indicating a future demand for the one or more cache lines by a processor core based on the history of memory access information;
identifying if a conflict exists between the first prediction and a second prediction of future demand for the one or more cache lines;
speculatively modifying, at the predictor, and based on the identifying if the conflict exists, coherence permissions for the one or more cache lines based on the predicted future demand, wherein speculatively modifying coherence permissions comprises modifying data access permissions to the one or more cache lines prior to the processor core initiating a memory access request to access data at the one or more cache lines; and
granting permission, at the predictor, to the processor core to access the one or more cache lines for a future memory access request.

2. The method of claim 1, wherein:
the predictor comprises a core predictor; and
monitoring the history of memory access information comprises tracking a history of memory access requests generated by the processor core.

3. The method of claim 1, wherein:
the predictor comprises a directory predictor; and
monitoring the history of access information comprises tracking a history of accesses by one or more processor cores to an individual cache line of the one or more cache lines.

4. The method of claim 3, wherein:
predicting the future demand comprises analyzing the history of accesses and determining a pattern in the history of accesses to the individual cache line between two or more processor cores for extrapolation of the pattern to the predicted future demand.

5. The method of claim 1, wherein:
the future demand is based on an identified pattern in a series of coherence permission requests for the one or more cache lines by the processor core.

6. The method of claim 1, wherein:
speculatively modifying coherence permissions comprises proactively demoting coherence permissions granted to the processor core for an individual cache line of the one or more caches line after a predicted permission lifetime, wherein the predicted permission lifetime comprises an estimated period of time after which the processor core no longer needs access to the individual cache line or a region of memory in which the individual cache line resides.

7. The method of claim 6, wherein:
predicting the future demand for the individual cache line comprises determining whether the processor core requests coherence permissions for the individual cache line subsequent to proactively demoting coherence permissions granted to the processor core for the individual cache line.

8. The method of claim 7, wherein:
speculatively modifying coherence permissions comprises modifying coherence permissions granted to the processor core for a subset of all cache lines for a region of memory in which the individual cache line resides.

9. A method, comprising:
generating, using a first type of predictor, a first prediction of future demand for a cache line;
generating, using a second type of predictor, a second prediction of future demand for the cache line;
identifying if a conflict exists between the first prediction and the second prediction; and
initiating a speculative coherence permission request for the cache line based on the first prediction of future demand for the cache line and the identifying if the conflict exists, wherein the speculative coherence permission request includes requesting data access permission to the cache line prior to a processor core initiating a memory access request to access data at the cache line.

10. The method of claim 9, further comprising:
declining to grant coherence permissions for the cache line in response to identifying that the conflict exists.

11. The method of claim 9, wherein:
the first type of predictor is a processor core predictor and the second type of predictor is a directory predictor; and
the directory predictor uses memory access information associated with the cache line to identify if the conflict exists.

12. The method of claim 9, wherein:
the first type of predictor is a directory predictor and the second type of predictor is a processor core predictor.

13. The method of claim 12, wherein:
the processor core predictor uses a historical sequence of memory addresses referenced by a processor core to generate the second prediction that the processor core will need future access to the cache line.

14. The method of claim 9, wherein:
initiating the speculative coherence permission request comprises generating a coherence message that includes an identifier to flag the coherence message as a speculative request for coherence permissions; and
the speculative request for coherence permissions is deniable by a recipient of the coherence message.

15. The method of claim 9, further comprising:
returning, based on declining to speculatively grant coherence permissions for the cache line, a negative acknowledgement message from a recipient of the speculative coherence permission request to a requestor that initiated the speculative coherence permission request.

16. A system comprising:
a plurality of processing nodes interconnected by an interconnect network, wherein each processing node comprises a processor core, a cache, a main memory, and a directory, wherein a directory of at least one of the plurality of processing nodes includes a directory predictor that:
monitors a history of memory access information associated with a cache line from the main memory of the at least one of the plurality of processing nodes and generates a first prediction indicative of a first future demand for the cache line based on the history of memory access information;
identifies if a conflict exists between the first prediction and a second prediction indicative of a second future demand for the cache line; and speculatively modifies, at the predictor, and based on the first prediction and based on identifying if the conflict exists, coherence permissions for the cache line.

17. The system of claim 16, wherein:
a processor core of at least one of the plurality of processing nodes includes a processor core predictor that uses a historical sequence of memory addresses referenced by the processor core of at least one of the plurality of processing nodes to predict a second future demand for the cache line.

18. The system of claim 16, wherein:
the directory predictor stores entries representing a coherence permission history that tracks a history of memory accesses for each individual cache line from the main memory of a particular one of the plurality of processing nodes in which the directory predictor physically resides.

19. The system of claim 16, wherein:
the directory predictor is configured to initiate a speculative coherence permission request for the cache line based on predicting the first future demand for the cache line.

20. The system of claim 19, wherein:
the directory predictor is further configured to generate a coherence message that includes an identifier to flag the coherence message as a speculative request for coherence permissions.

* * * * *